(12) United States Patent
Kikuchi

(10) Patent No.: US 9,729,794 B2
(45) Date of Patent: Aug. 8, 2017

(54) DISPLAY DEVICE, DISPLAY CONTROL METHOD, AND NON-TRANSITORY RECORDING MEDIUM

(71) Applicant: CASIO COMPUTER CO., LTD., Shibuya-ku, Tokyo (JP)

(72) Inventor: Masaaki Kikuchi, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 14/801,156

(22) Filed: Jul. 16, 2015

(65) Prior Publication Data

US 2016/0037075 A1 Feb. 4, 2016

(30) Foreign Application Priority Data

Jul. 30, 2014 (JP) .................................. 2014-155335

(51) Int. Cl.
*H04N 5/232* (2006.01)
*H04N 5/225* (2006.01)

(52) U.S. Cl.
CPC ....... *H04N 5/23293* (2013.01); *H04N 5/2258* (2013.01)

(58) Field of Classification Search
CPC ..................... H04N 5/23293; H04N 5/2256
See application file for complete search history.

(56) References Cited

U.S. PATENT DOCUMENTS

| | | | |
|---|---|---|---|
| 9,085,927 B2 * | 7/2015 | Oshima | H04B 10/11 |
| 2002/0113882 A1 * | 8/2002 | Pollard | H04N 1/00835 348/239 |
| 2003/0058262 A1 * | 3/2003 | Sato | H04B 10/11 345/690 |
| 2004/0161246 A1 * | 8/2004 | Matsushita | G06F 3/002 398/187 |
| 2004/0175053 A1 * | 9/2004 | Kawamata | G06T 5/10 382/260 |
| 2006/0056855 A1 * | 3/2006 | Nakagawa | G09F 9/33 398/183 |
| 2012/0328302 A1 * | 12/2012 | Iizuka | H04B 10/1129 398/130 |
| 2014/0205136 A1 * | 7/2014 | Oshima | G09G 3/20 382/100 |
| 2015/0002734 A1 * | 1/2015 | Lee | H04N 5/2256 348/367 |

FOREIGN PATENT DOCUMENTS

JP 2007147994 A 6/2007

* cited by examiner

*Primary Examiner* — Jason Flohre
(74) *Attorney, Agent, or Firm* — Holtz, Holtz & Volek PC

(57) ABSTRACT

In a smartphone, the imaging mode of an imager or the display mode of a display is changed from a normal mode when an image of an optical communication region is captured. More specifically, a process of lowering the contrast of the entire image (frame), a process of superimposing an icon image on the candidate region, a masking process for lowering the contrast of the candidate region, a process of reducing the count of display frames by image averaging or thinning, or a zoom limiting process of limiting the upper limit of the zoom ratio of the imager or the upper limit of the enlarged display magnification on the display is performed.

4 Claims, 12 Drawing Sheets

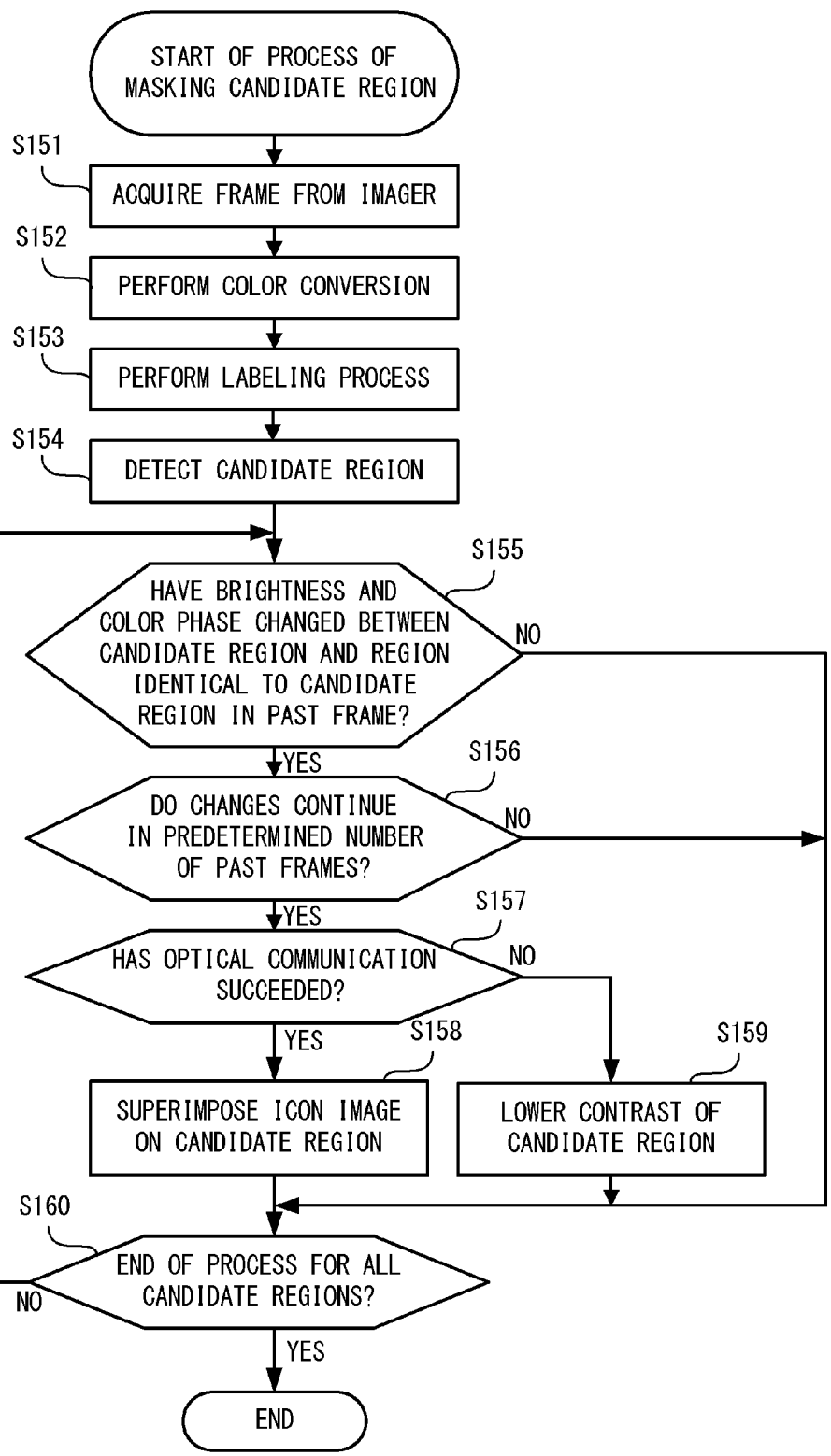

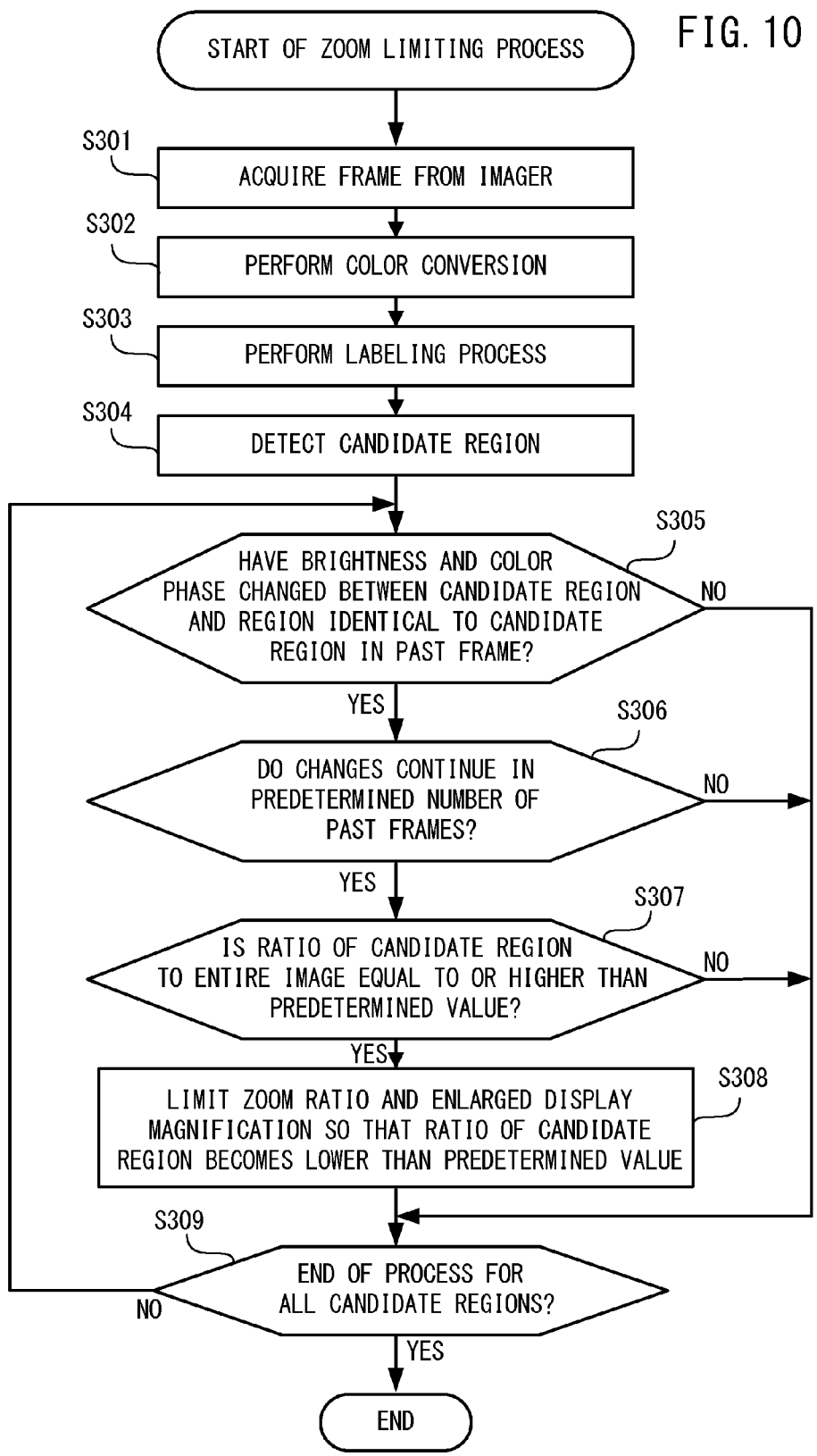

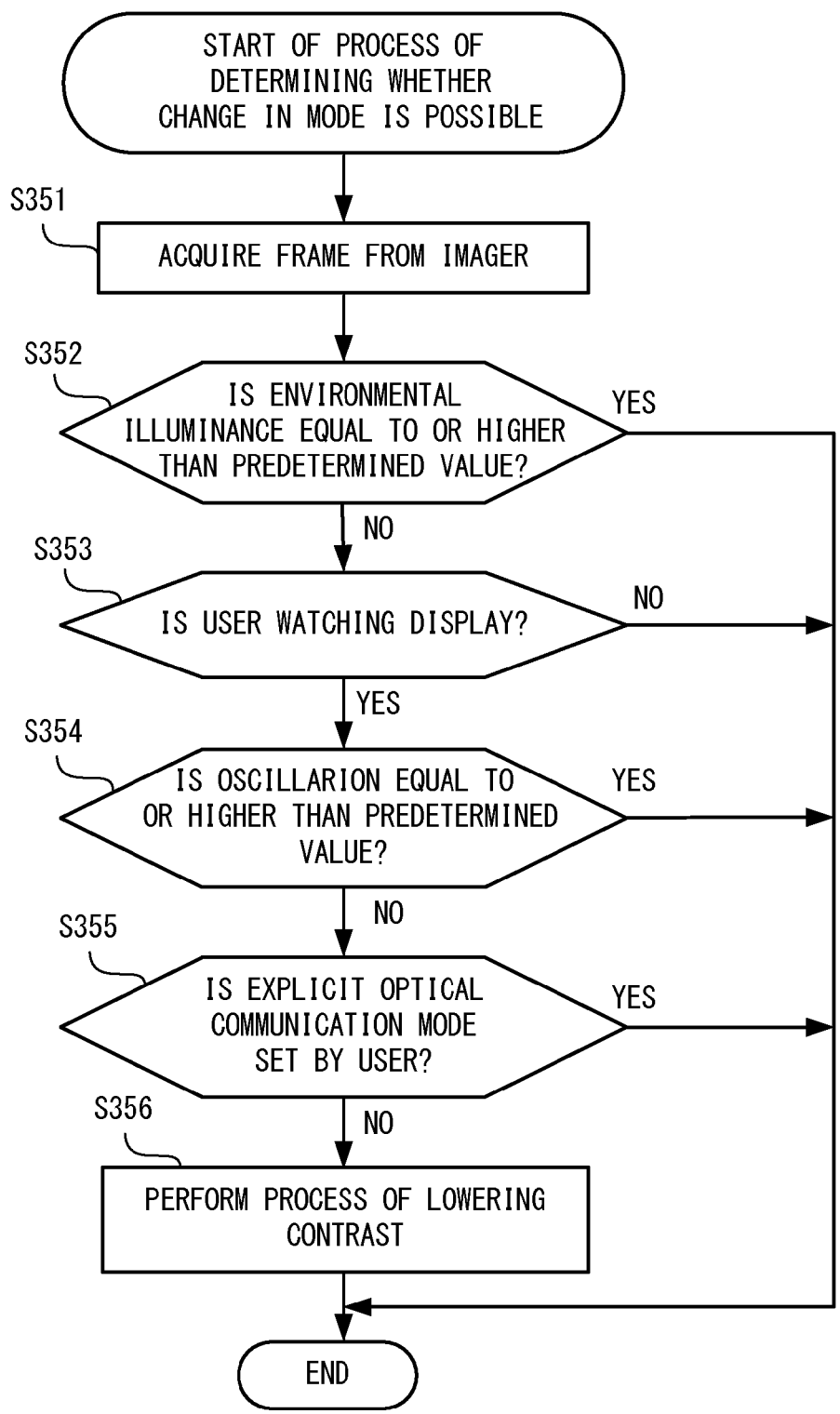

DISPLAY DEVICE, DISPLAY CONTROL METHOD, AND NON-TRANSITORY RECORDING MEDIUM

This application claims the benefit of Japanese Patent Application No. 2014-155335, filed on Jul. 30, 2014, the entire disclosure of which is incorporated by reference herein.

FIELD

This application relates generally to a display device, a display control method, and a non-transitory recording medium.

BACKGROUND

Techniques for optical communication by processing captured time-series images (frames) are known. When a technique described in, for example, Unexamined Japanese Patent Application Kokai Publication No. 2007-147994 is employed as a transmitter including, as a light source, an outdoor lighting or the like that emits light modulated in accordance with information, a camera built in a communicator captures an image of the transmitter and received light is demodulated to obtain information.

SUMMARY

A display device according to an aspect of the present disclosure includes an imager, a display, and a mode changer. The imager captures an image. The display displays the image captured by the imager. The mode changer can change at least one of an imaging mode implemented by the imager and a display mode of the image implemented by the display from a mode defined as a reference, when the image captured by the imager includes an image that bears a change of light from an information light source.

A display control method according to another aspect of the present disclosure includes image capturing, displaying, and mode changing steps. In the image capturing step, an image is captured. In the displaying step, the image captured in the image capturing step is displayed. In the mode changing step, at least one of an imaging mode implemented in the image capturing step and a display mode of the image implemented in the displaying step can be changed from a mode defined as a reference, when the image captured in the image capturing step includes an image that bears a change of light from an information light source.

A non-transitory recording medium recording a program executable by a computer according to still another aspect of the present disclosure records a program for causing the computer to function as a display outputter and a mode changer. The display outputter outputs by display an image captured by an imager. The mode changer can change at least one of an imaging mode implemented by the imager and a display mode of the image output from the display outputter from a mode defined as a reference, when the captured image includes an image that bears a change of light from an information light source.

BRIEF DESCRIPTION OF THE DRAWINGS

A more complete understanding of this application can be obtained when the following detailed description is considered in conjunction with the following drawings, in which:

FIG. 5 is a flowchart showing a process of masking a candidate region;

FIG. 10 is a flowchart showing a zoom limiting process;

FIG. 12 is a flowchart showing a process of determining whether a change in mode is possible.

DETAILED DESCRIPTION

A display device, a display control method, and a display control program according to an exemplary embodiment of the present disclosure will be described below with reference to the accompanying drawings.

Figure 1:
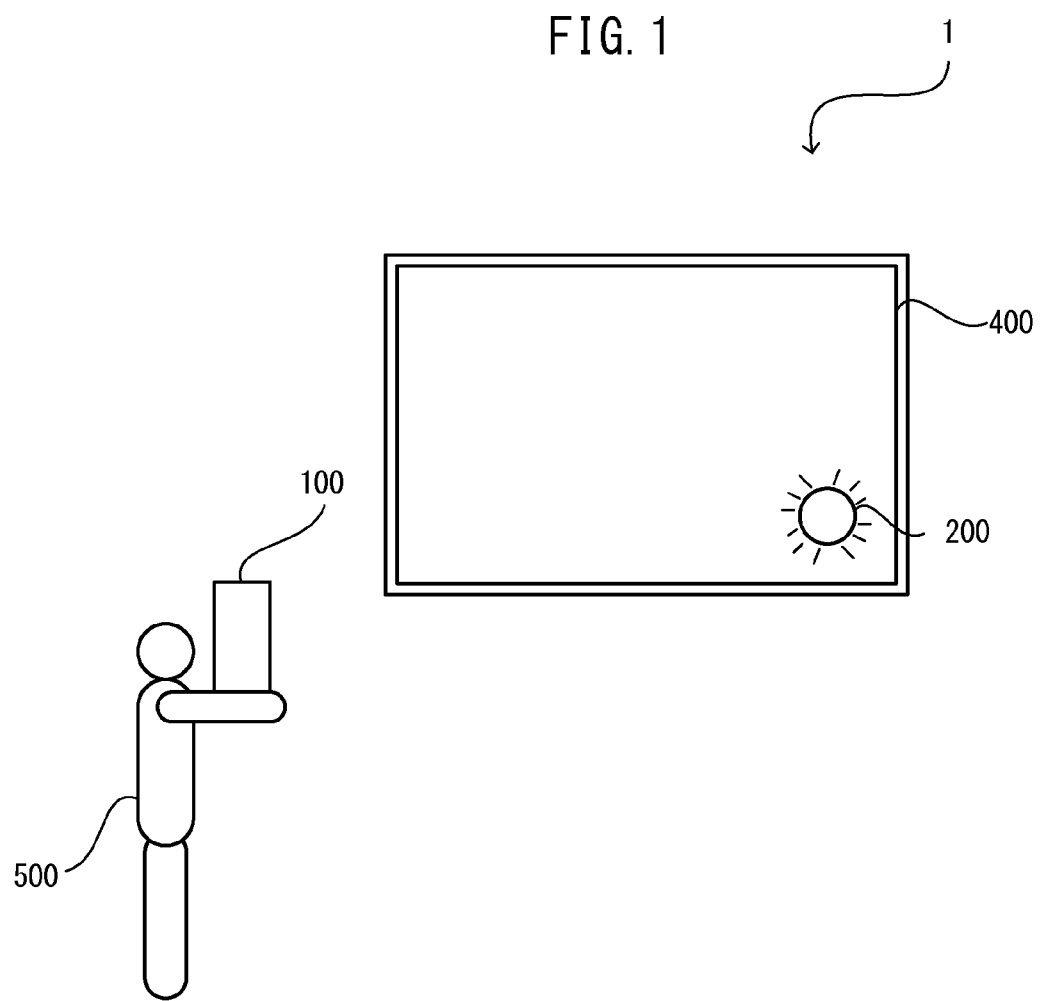
FIG. 1 is a view showing an exemplary configuration of an information providing system including a smartphone.

FIG. 1 is a view showing the configuration of an information providing system including a display device according to an exemplary embodiment of the present disclosure. An information providing system 1 shown in FIG. 1 includes a smartphone 100 serving as a display device and a large display device 400 set on the street. The smartphone 100 receives light from an optical communication region 200 on the large display device 400 to perform optical communication.

The large display device 400 includes an array of luminous elements such as Light Emitting Diodes (LEDs). Part (the lower left in FIG. 1) of the large display device 400 is provided with the optical communication region 200 that blinks during optical communication. The optical communication region 200 emits light modulated by color transition or luminance (blinking) in correspondence with various types of information (contents) such as advertisements.

More specifically, the large display device 400 encodes contents data into a bit data string and performs digital modulation based on the bit data string. Although arbitrary schemes of encoding and modulation can be used, 4 Pulse Position Modulation (PPM) that uses a carrier wave having a frequency of 28.8 kHz is desirably adopted as the modulation scheme. The large display device 400 generates a driving signal. The driving signal corresponds to a digitally modulated signal and is used to temporally change the light emitting colors (more specifically, three, R, G, and B colors) in order for transmission with multi-level luminance and hue values. The large display device 400 then emits light from the optical communication region 200 based on the driving signal.

The smartphone 100 is owned by a user 500. The smartphone 100 acquires contents upon receiving light from the optical communication region 200 on the large display device 400 and performs, for example, display of the contents.

Figure 2:
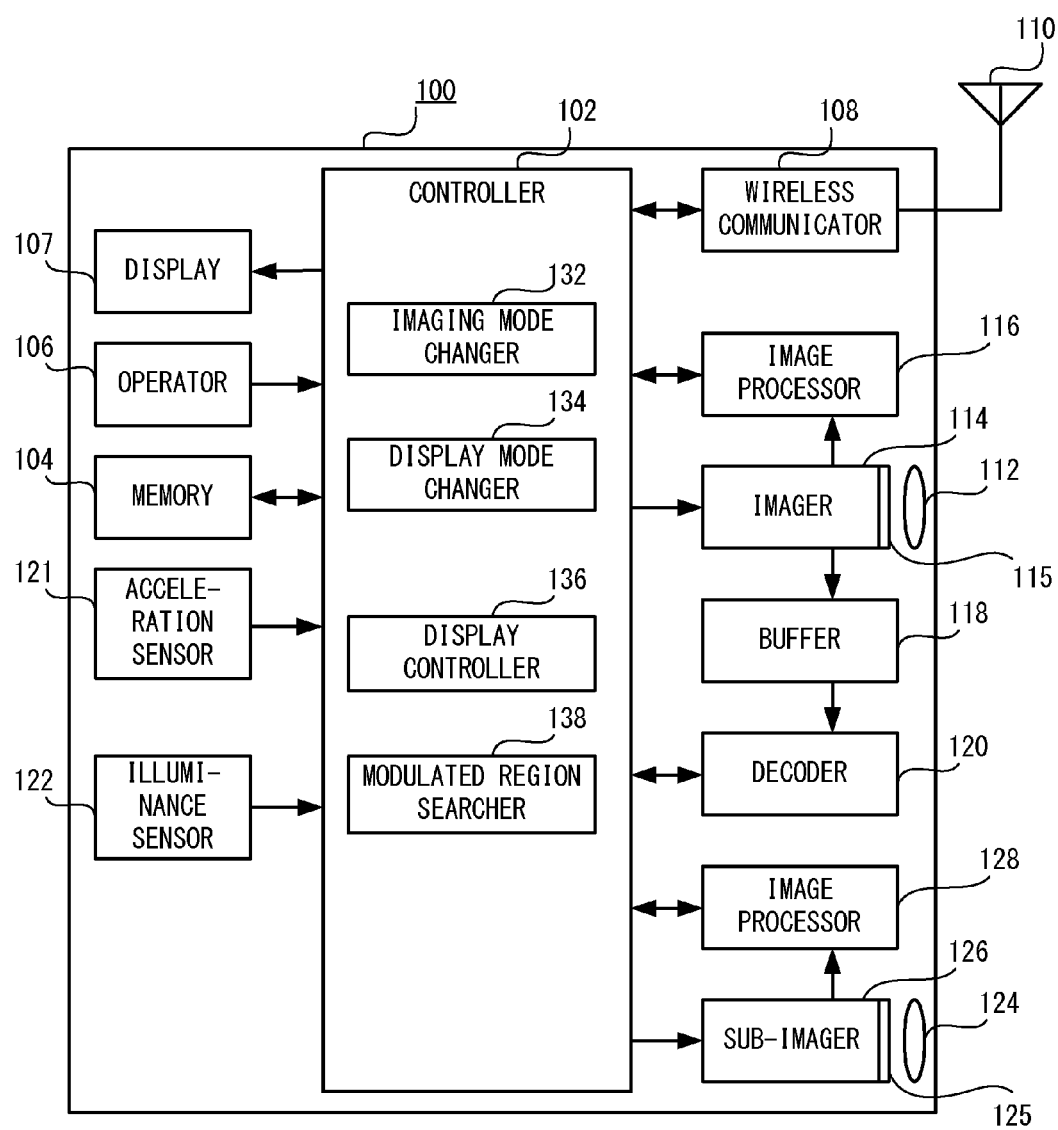
FIG. 2 is a block diagram showing an exemplary configuration of the smartphone.

FIG. 2 is a block diagram showing an exemplary configuration of the smartphone 100. The smartphone 100 includes a controller 102, a memory 104, an operator 106, a display 107, a wireless communicator 108, an antenna 110, a lens 112, an imager 114, an image processor 116, a buffer 118, a decoder 120, an acceleration sensor 121, an illuminance sensor 122, a lens 124, a sub-imager 126, and an image processor 128, as shown in FIG. 2.

The controller 102 is implemented using a Central Processing Unit (CPU). The controller 102 executes a software process in accordance with a program (for example, a program for implementing the operations of the smartphone 100 shown in FIGS. 3, 5, 7, 9, 10, and 12 (to be described later)) stored in the memory 104 to control various functions (for example, an imaging mode changer 132, a display mode changer 134, and a display controller 136) of the smartphone 100. The memory 104 is implemented in, for example, a Random Access Memory (RAM) or a Read Only Memory (ROM). The memory 104 stores various types of information (for example, programs) used for control and the like in the smartphone 100.

The operator 106 is implemented in an interface that includes, for example, a numeric keypad and function keys and is used to input the operation contents of the user. The display 107 is implemented using, for example, an Liquid Crystal Display (LCD), a Plasma Display Panel (PDP), or an Electroluminescence (EL) display. The display 107 displays an image (for example, a live view image (to be described later)) in accordance with an image signal output from the controller 102.

The wireless communicator 108 is implemented using, for example, an Radio Frequency (RF) circuit or a Base Band (BB) circuit. The wireless communicator 108 transmits and receives radio signals via the antenna 110. Further, the wireless communicator 108 encodes and modulates a transmission signal and demodulates and decodes a reception signal.

The lens 112 is implemented using, for example, a zoom lens. The lens 112 moves by a zoom control operation from the operator 106 and focusing control by the controller 102. Upon the movement of the lens 112, the angle of view of imaging by the imager 114 and an optical image captured by the imager 114 are controlled.

The imager 114 is placed on a surface of a housing of the smartphone 100 opposite to a surface of the housing provided with the display 107. The imager 114 is implemented using a plurality of light-receiving elements regularly, two-dimensionally arrayed on a light-receiving surface 115. Each light-receiving element is implemented using an image sensing device such as a Charge Coupled Device (CCD) or a Complementary Metal Oxide Semiconductor (CMOS). The imager 114 captures (receives) an optical image, incident through the lens 112, at an imaging angle of view that falls within a predetermined range based on a control signal from the controller 102, and converts an image signal within the imaging angle of view into digital data to generate a frame. The imager 114 temporally continuously performs image capturing and frame generation, outputs image data of successive frames to the image processor 116, sequentially stores the image data in the buffer 118, and updates the image data.

A modulated region searcher 138 provided in the controller 102 searches for a portion that suffers at least one of changes in brightness and color phase by optical communication in the frame, as an image that bears a change of light. More specifically, the modulated region searcher 138 determines the brightness and color phase of each pixel in the frame image data stored in the buffer 118. The modulated region searcher 138 then identifies a pixel, having a brightness equal to or higher than a predetermined value, as a candidate (candidate region) for a portion (change region) that suffers changes in brightness and color phase by receiving light from the optical communication region 200. The modulated region searcher 138 determines the brightness and the color phase at the same coordinates in the candidate region of each of a predetermined number of frames acquired latest. If the brightness or the numerical value representing the color phase at the coordinates in the candidate region is determined to greatly change in a predetermined pattern so that, for example, this brightness is equal to or higher than a first predetermined value in one frame and equal to or lower than a second predetermined value in another frame or this numerical value is equal to a third predetermined value in one frame and equal to a fourth predetermined value in another frame, the candidate region is identified as a portion (change region) that suffers at least one of changes in brightness and color phase by receiving light from the optical communication region 200. The modulated region searcher 138 binarizes each pixel in the candidate region as needed in accordance with a change in brightness or color phase and classifies (labels) these pixels into white or black.

If a change region is present, the modulated region searcher 138 decodes the coordinates of the change region in the frame (referred to as "change coordinates" hereinafter) and the modes of temporal changes in brightness and color phase among the latest predetermined number of frames at these change coordinates into a bit data string, stores the bit data string on a coordinate data list set in the buffer 118, and updates the bit data string.

The image processor 116 adjusts, based on a control signal from the controller 102, the quality and size of the frame image data (digital data) output from the imager 114 and outputs this data to the controller 102 to display this data on the display 107 as a live view image. The image processor 116 functions to encode and file, using, for example, a compression coding scheme such as JPEG (Joint Photographic Experts Group), an optical image within the angle of view of imaging by the imager 114 or within the display range in which the optical image is displayed on the display 107 upon a record instruction when a control signal based on a record instruction operation from the operator 106 is input. The display controller 136 in the controller 102 performs control to display a live view image on the display 107, based on the frame image data acquired from the image processor 116.

The decoder 120 decodes the bit data string representing the modes of changes in brightness and color phase stored on the coordinate data list in the buffer 118 into digital data (contents data) based on a control signal from the controller 102. The decoder 120 outputs the contents data and information for specifying a change region to the controller 102. A scheme corresponding to the encoding scheme in the optical communication region 200 is adopted as the decoding scheme. The controller 102 stores in the memory 104 the contents data and the information for specifying a change region. The display controller 136 in the controller 102 performs control to display a contents image on the display 107, based on the input contents data.

The acceleration sensor 121 detects the acceleration of the smartphone 100 and outputs an acceleration value to the controller 102. The illuminance sensor 122 detects the illuminance in the vicinity of the smartphone 100 and outputs an illuminance value to the controller 102.

The lens 124 is implemented using, for example, a zoom lens, like the lens 112. The lens 124 moves by a zoom control operation from the operator 106 and focusing control by the controller 102. Upon the movement of the lens 124, the angle of view of imaging by the sub-imager 126 and an optical image captured by the sub-imager 126 are controlled.

The sub-imager 126 is placed on the surface of the housing of the smartphone 100, provided with the display 107. The sub-imager 126 is implemented using an image sensing device including, for example, a plurality of light-receiving elements (CCDs or CMOSs) regularly, two-dimensionally arrayed on a light-receiving surface 125, like the imager 114. The sub-imager 126 captures (receives) an optical image, incident through the lens 124, at an imaging angle of view that falls within a predetermined range based on a control signal from the controller 102, and converts an image signal within the imaging angle of view into digital data to generate a frame.

The operation of the smartphone 100 during optical communication will be described below with reference to first to sixth operations. The following first to sixth operations are performed in the smartphone 100 when an application for optical communication is executed.

(First Operation)

Figure 3:
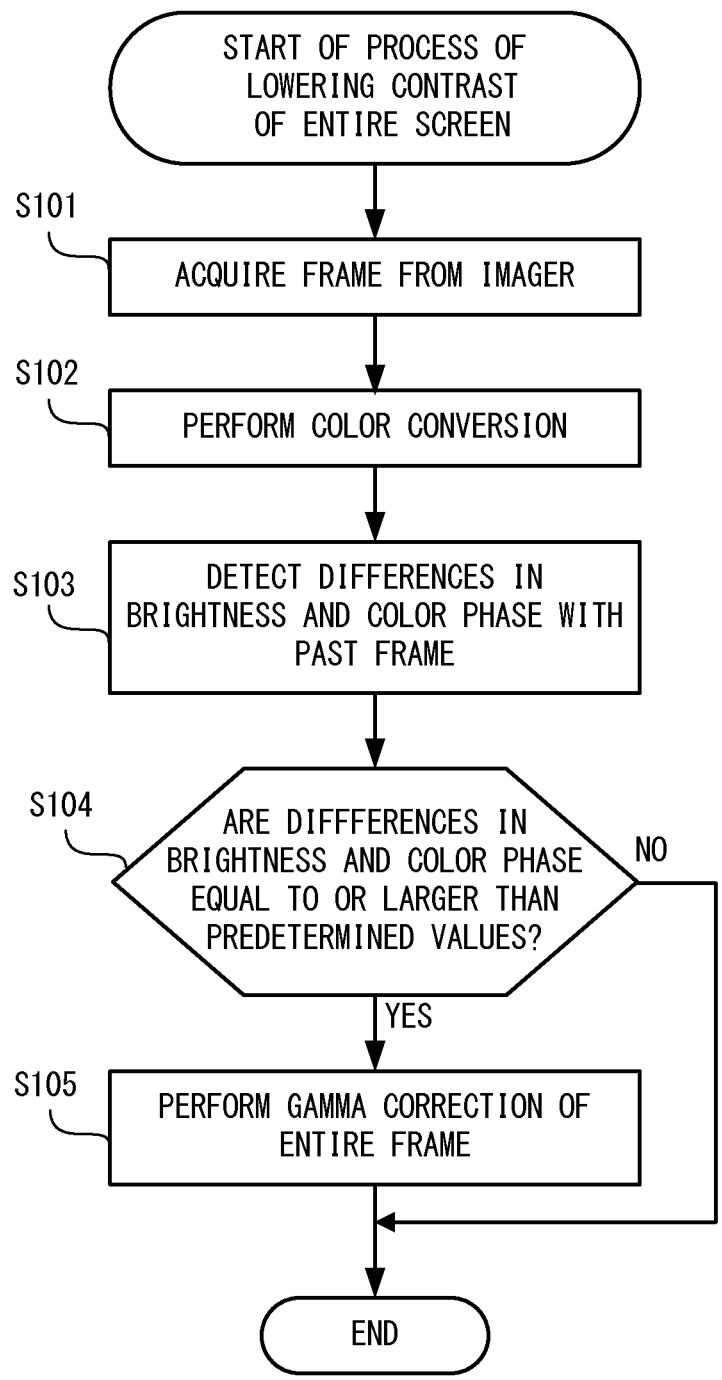
FIG. 3 is a flowchart showing a process of lowering the contrast of the entire screen.

FIG. 3 is a flowchart showing a process of lowering the contrast (difference in brightness) of the entire screen as the first operation during optical communication of the smartphone 100.

The display controller 136 in the controller 102 of the smartphone 100 acquires, through the image processor 116, frame image data captured by the imager 114 (step S101). The display controller 136 performs a predetermined color conversion process for the frame image data to convert this data into RGB frame image data represented by a combination of the three primary colors of light, namely, red, green, and blue (step S102). The display controller 136 stores RGB frame image data in the memory 104 every time this data is acquired.

The display mode changer 134 in the controller 102 detects the differences in brightness and color phase between the RGB frame image data acquired this time from the imager 114 and RGB frame image data acquired in the past from the imager 114 (step S103). More specifically, the display mode changer 134 reads out past RGB frame image data stored in the memory 104. The display controller 136 digitizes the differences in brightness and color phase at the same coordinates of the frame between the RGB frame image data acquired this time and past RGB frame image data read out from the memory 104.

The display mode changer 134 determines whether the numerical value of the difference in brightness and the numerical value of the difference in color phase at each coordinate position are equal to or larger than predetermined values (step S104).

If at least one of the numerical value of the difference in brightness and the numerical value of the difference in color phase at each coordinate position is equal to or larger than the predetermined value (YES in step S104), the display mode changer 134 performs gamma correction to lower the contrast of the entire frame of the RGB frame image data acquired this time (step S105). The display controller 136 performs control to display a live view image on the display 107, based on the RGB frame image data after gamma correction. On the other hand, if neither the numerical value of the difference in brightness nor the numerical value of the difference in color phase is equal to or larger than the predetermined value (NO in step S104), the process in step S105 is skipped.

Figure 4A:
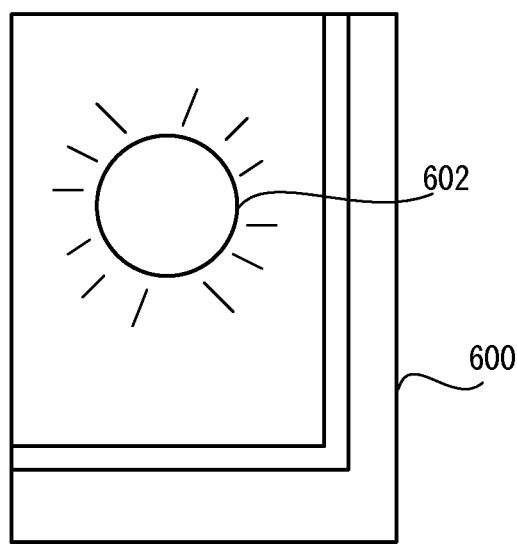
FIG. 4A is a view illustrating a first exemplary display screen of the smartphone, on which an entire image including an image in an optical communication region is displayed.
Figure 4B:
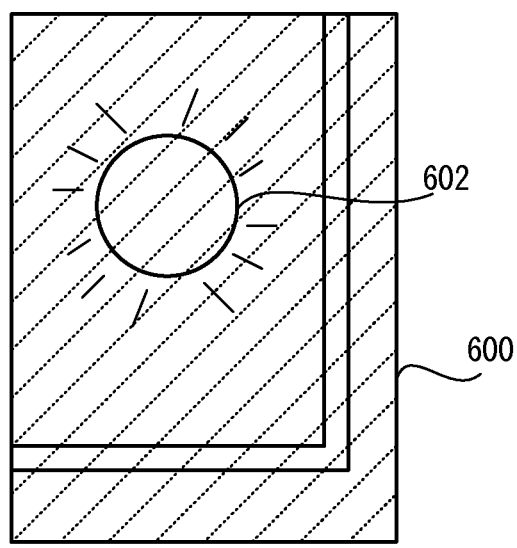
FIG. 4B is a view illustrating another first exemplary display screen of the smartphone, on which the contrast of the entire image is lowered as a whole by the process of lowering the contrast of the entire screen.

By the above-mentioned process of lowering the contrast of the entire screen, an image is displayed on the display 107 at a lower contrast. For example, an entire image 600 including an image 602 in the optical communication region 200 is normally displayed, as shown in FIG. 4A, while the entire image 600 is displayed at a lower contrast as a whole, as shown in FIG. 4B, by the process of lowering the contrast of the entire screen.

(Second Operation)

FIG. 5 is a flowchart showing a process of masking a candidate region as the second operation during optical communication of the smartphone 100.

The operations in steps S151 and S152 are the same as the operations in steps S101 and S102, respectively, in FIG. 3. That is, the display controller 136 in the controller 102 of the smartphone 100 acquires, through the image processor 116, frame image data captured by the imager 114 (step S151). The display controller 136 performs a predetermined color conversion process for the frame image data to convert this data into RGB frame image data represented by a combination of the three primary colors of light, namely, red, green, and blue (step S152). The display controller 136 stores RGB frame image data in the memory 104 every time this data is acquired.

The modulated region searcher 138 in the controller 102 performs a process of labeling pixels in the frame (step S153). More specifically, the modulated region searcher 138 binarizes each pixel in the frame as needed in accordance with the brightness and classifies (labels) these pixels into white or black. The modulated region searcher 138 assigns unique numbers to respective regions of continuous white or black pixels.

The modulated region searcher 138 detects a candidate region in the frame (step S154). More specifically, the modulated region searcher 138 determines the brightness of each pixel in the frame. The modulated region searcher 138 then identifies a pixel having a brightness equal to or higher than a predetermined value as a candidate region.

The modulated region searcher 138 determines whether at least one of the brightness and the color phase has changed between the candidate region and a region identical to the candidate region in the past frame (step S155). More specifically, the modulated region searcher 138 determines changes in brightness and color phase at the same coordinates in a candidate region between the frame acquired this time and each of a predetermined number of past frames. If the brightness or the numerical value representing the color phase is determined to greatly change in a predetermined pattern so that, for example, this brightness is equal to or higher than a first predetermined value in one frame and equal to or lower than a second predetermined value in another frame or this numerical value is equal to a third predetermined value in one frame and equal to a fourth predetermined value in another frame, the modulated region searcher 138 determines that the brightness and the color phase have changed between the candidate region and a region identical to the candidate region in the past frame.

If at least one of the brightness and the color phase has changed between the candidate region and a region identical to the candidate region in the past frame (YES in step S155), the modulated region searcher 138 further determines whether at least one of the changes in brightness and color phase continues in the predetermined number of past frames (step S156). More specifically, if the result of the process in step S155 reveals that at the same coordinates in the candidate region of each of the predetermined number of past frames, the brightness or the numerical value representing the color phase at the coordinates in the candidate region is determined to greatly change in a predetermined pattern so that, for example, this brightness is equal to or higher than a first predetermined value in one frame and equal to or lower than a second predetermined value in another frame or this numerical value is equal to a third predetermined value in one frame and equal to a fourth predetermined value in another frame, the modulated region searcher 138 determines that at least one of the changes in brightness and color phase continues in the predetermined number of past frames.

If at least one of the brightness and the color phase has changed between the candidate region and a region identical to the candidate region in the past frame, and at least one of the changes in brightness and color phase continues in the predetermined number of past frames, the candidate region is identified as a change region.

If at least one of the changes in brightness and color phase continues in the predetermined number of past frames (YES in step S156), the modulated region searcher 138 outputs information for specifying a change region in the frame to the controller 102. The controller 102 determines whether optical communication has succeeded (step S157). More specifically, if the decoder 120 has succeeded in decoding and contents data is acquired from the decoder 120, the controller 102 determines that optical communication has succeeded; otherwise, the controller 102 determines that optical communication has failed.

Figure 6A:
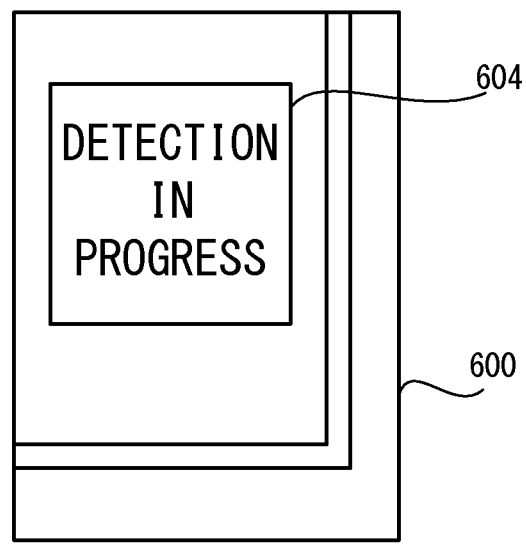
FIG. 6A is a view illustrating a second exemplary display screen of the smartphone, on which an icon image such as "Detection in Progress" is displayed in the candidate region of the entire image.

If optical communication has succeeded (YES in step S157), the display mode changer 134 performs a process of superimposing an icon image on an image of the candidate region for the RGB frame image data acquired this time, to mask (shield) the candidate region (step S158). A candidate region in the frame is specified using information for specifying a change region in the frame from the modulated region searcher 138. The display controller 136 performs control to display a live view image on the display 107, based on the RGB frame image data after icon image superimposition. With this operation, an icon image 604 such as "Detection in Progress" is displayed at the position of the candidate region in the entire image 600, as shown in, for example, FIG. 6A.

Figure 6B:
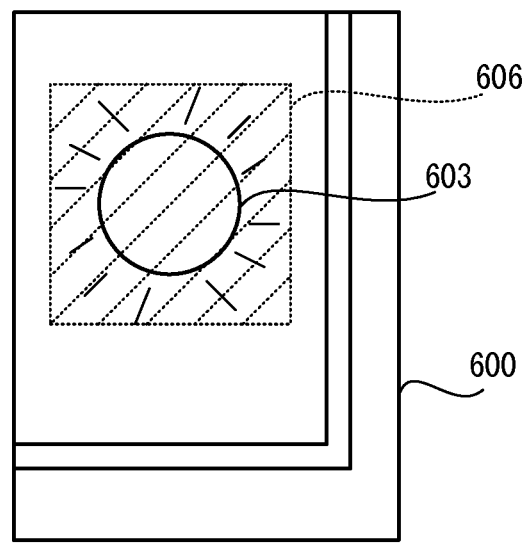
FIG. 6B is a view illustrating another second exemplary display screen of the smartphone, on which the contrast of an image in a region including an image in the candidate region is lowered in the entire image.

On the other hand, if optical communication has failed (NO in step S157), the display mode changer 134 performs a process of lowering the contrast of the candidate region, such as gamma correction, for the RGB frame image data acquired this time (step S159). The display controller 136 performs control to display a live view image on the display 107, based on the RGB frame image data after the contrast of the candidate region lowers. With this operation, an image 606 of a region including an image 603 of the candidate region is displayed in the entire image 600 at a lower contrast, as shown in, for example, FIG. 6B.

When a process of superimposing an icon image on an image of the candidate region is performed in step S158, a process of lowering the contrast of the candidate region is performed in step S159, the modulated region searcher 138 determines in step S155 that neither the brightness nor the color phase has changed between the candidate region and a region identical to the candidate region in the past frame (NO in step S155), or the modulated region searcher 138 determines in step S156 that neither the brightness nor the color phase continues to change in the predetermined number of past frames (NO in step S156), the controller 102 then determines whether the processes in steps S155 to S159 have ended for all candidate regions (step S160). If the processes in steps S155 to S159 have not yet ended for all candidate regions (NO in step S160), the operations in step S155 and subsequent steps are repeated for candidate regions to be processed. On the other hand, if the processes in steps S155 to S159 have ended for all candidate regions (YES in step S160), a series of operations ends.

(Third Operation)

Figure 7:
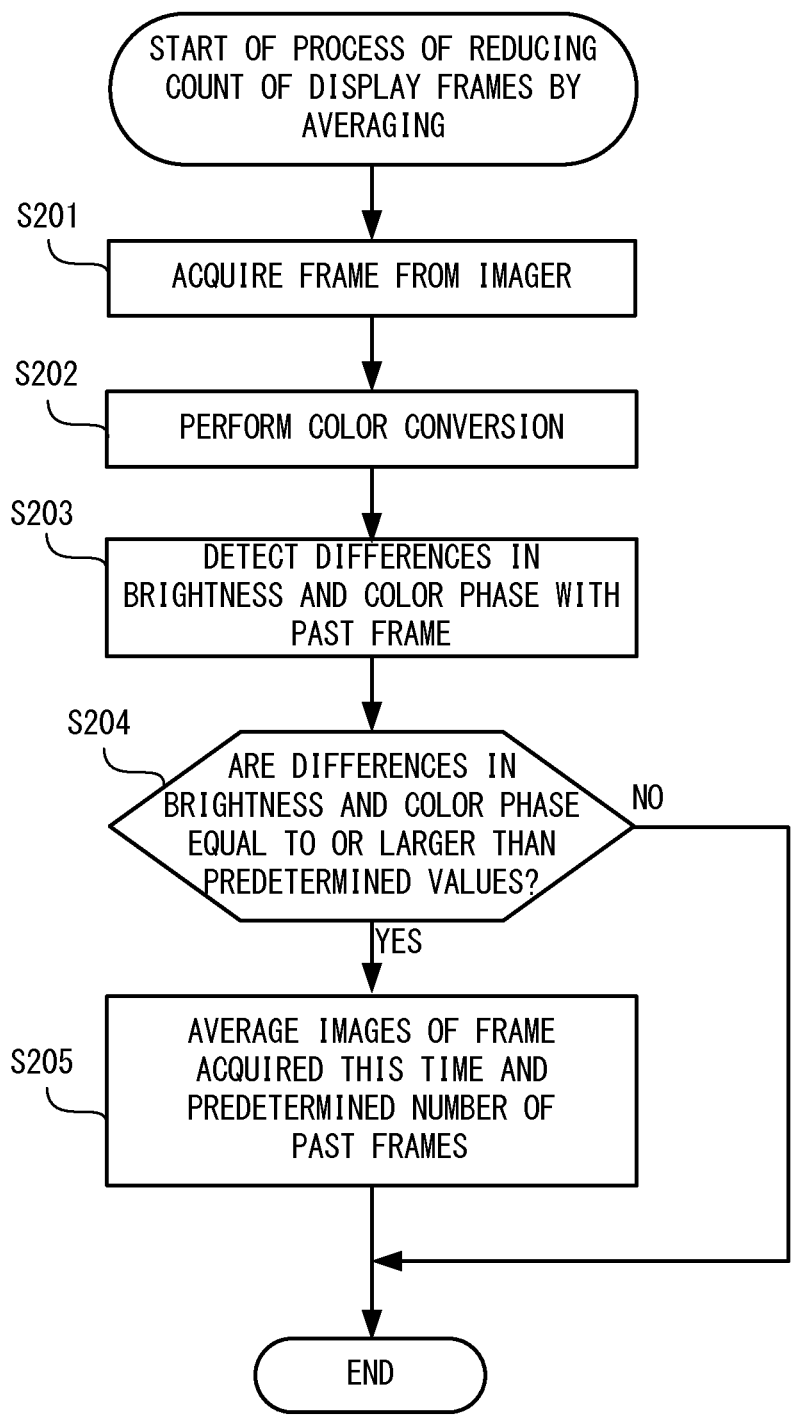
FIG. 7 is a flowchart showing a process of reducing the count of display frames by averaging.

FIG. 7 is a flowchart showing a process of reducing the count of display frames by averaging as the third operation during optical communication of the smartphone 100.

The operations in steps S201 to S204 are the same as the operations in steps S101 to S104, respectively, in FIG. 3. That is, the display controller 136 in the controller 102 of the smartphone 100 acquires, through the image processor 116, frame image data captured by the imager 114 (step S201). The display controller 136 performs a predetermined color conversion process for the frame image data to convert this data into RGB frame image data represented by a combination of the three primary colors of light, namely, red, green, and blue (step S202). The display controller 136 stores RGB frame image data in the memory 104 every time this data is acquired.

The display mode changer 134 in the controller 102 detects the differences in brightness and color phase between the RGB frame image data acquired this time from the imager 114 and RGB frame image data acquired in the past from the imager 114 (step S203). The display mode changer 134 determines whether the numerical value of the difference in brightness at each coordinate position is equal to or larger than a predetermined value and the numerical value of the difference in color phase at each coordinate position is equal to or larger than a predetermined value (step S204).

Figure 8:
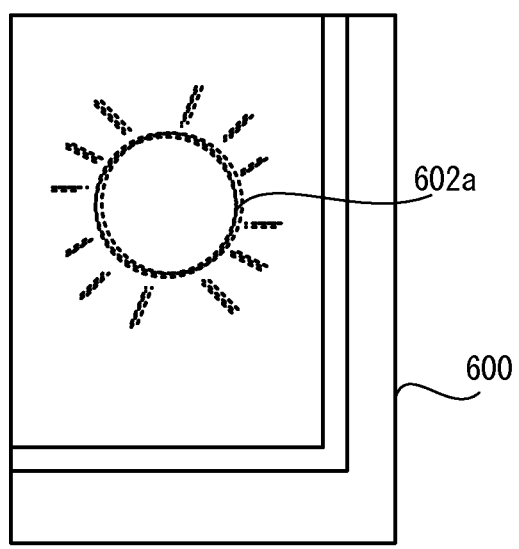
FIG. 8 is a view illustrating a third exemplary display screen of the smartphone.

If neither the numerical value of the difference in brightness nor the numerical value of the difference in color phase at each coordinate position is equal to or larger than the predetermined value (NO in step S204), a series of operations ends. On the other hand, if at least one of the numerical value of the difference in brightness and the numerical value of the difference in color phase at each coordinate position is equal to or larger than the predetermined value (YES in step S204), the display mode changer 134 averages the RGB frame image data acquired this time and image data of a predetermined number of past RGB frames (step S205). More specifically, the display mode changer 134 calculates the average of brightness values and the average of color phase values for a pixel at the same coordinates in the RGB frame image data acquired this time and image data of a predetermined number of past RGB frames and determines these averages as the brightness and color phase values of this pixel. The display controller 136 performs control to display a live view image on the display 107, based on the averaged RGB frame image data. With this operation, the entire image 600 includes an image 602a obtained by averaging images of the optical communication region 200, as shown in, for example, FIG. 8.

(Fourth Operation)

Figure 9:
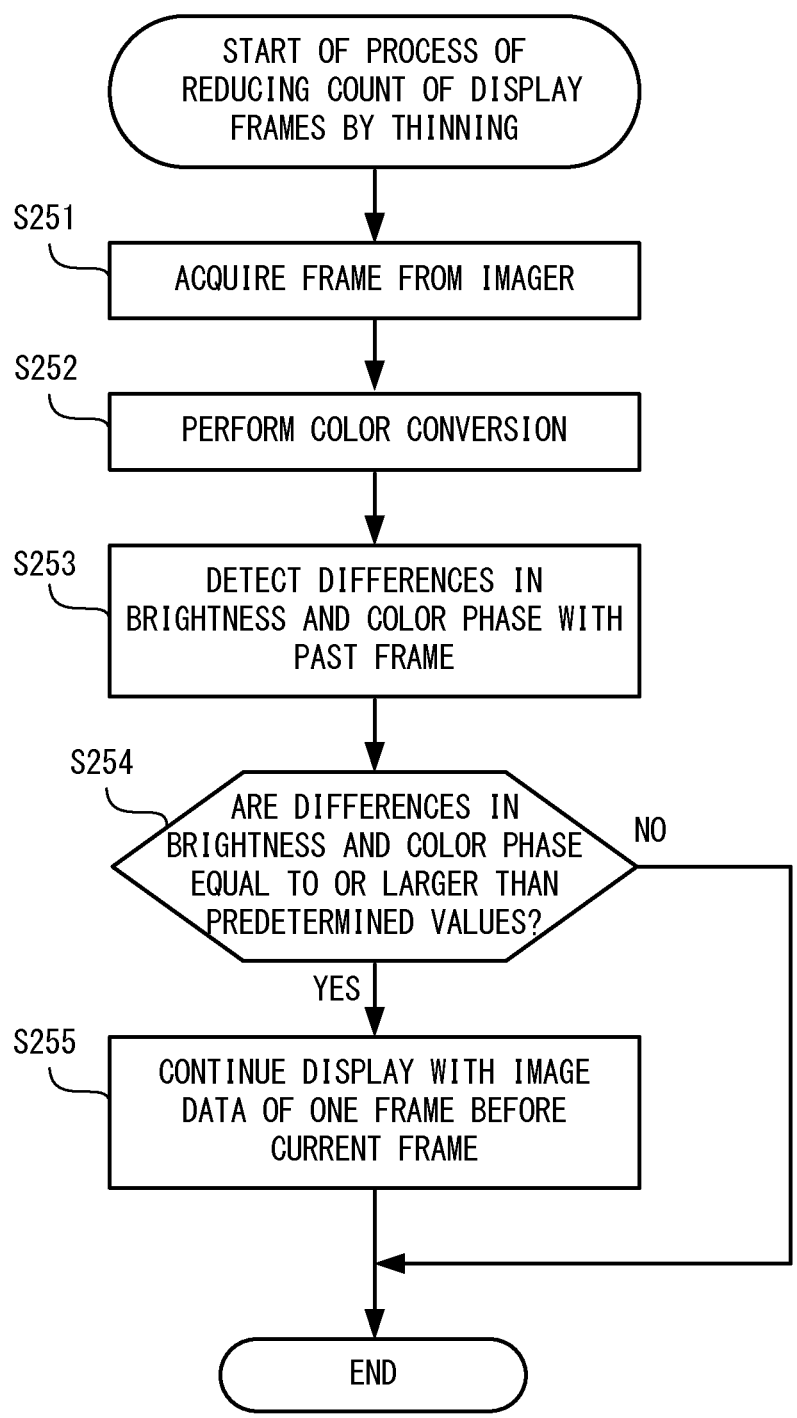
FIG. 9 is a flowchart showing a process of reducing the count of display frames by thinning.

FIG. 9 is a flowchart showing a process of reducing the count of display frames by thinning as the fourth operation during optical communication of the smartphone 100.

The operations in steps S251 to S254 are the same as the operations in steps S101 to S104, respectively, in FIG. 3. That is, the display controller 136 in the controller 102 of the smartphone 100 acquires, through the image processor 116, frame image data captured by the imager 114 (step S251). The display controller 136 performs a predetermined color conversion process for the frame image data to convert this data into RGB frame image data represented by a combination of the three primary colors of light, namely, red, green, and blue (step S252). The display controller 136 stores RGB frame image data in the memory 104 every time this data is acquired.

The display mode changer 134 in the controller 102 detects the differences in brightness and color phase between the RGB frame image data acquired this time from the imager 114 and RGB frame image data acquired in the past from the imager 114 (step S253). The display mode changer 134 determines whether the numerical value of the difference in brightness at each coordinate position is equal to or larger than a predetermined value and the numerical value of the difference in color phase at each coordinate position is equal to or larger than a predetermined value (step S254).

If at least one of the numerical value of the difference in brightness and the numerical value of the difference in color phase at each coordinate position is equal to or larger than the predetermined value (YES in step S254), the display mode changer 134 performs control to limit image display based on the RGB frame image data acquired this time and continue display with image data of one RGB frame before the current RGB frame (step S255). On the other hand, if neither the numerical value of the difference in brightness nor the numerical value of the difference in color phase is equal to or larger than the predetermined value (NO in step S254), the process in step S255 is skipped.

(Fifth Operation)

FIG. 10 is a flowchart showing a zoom limiting process as the fifth operation during optical communication of the smartphone 100.

The operations in steps S301 to S306 are the same as the operations in steps S151 to S156, respectively, in FIG. 5. That is, the display controller 136 in the controller 102 of the smartphone 100 acquires, through the image processor 116, frame image data captured by the imager 114 (step S301). The display controller 136 performs a predetermined color conversion process for the frame image data to convert this data into RGB frame image data represented by a combination of the three primary colors of light, namely, red, green, and blue (step S302). The display controller 136 stores RGB frame image data in the memory 104 every time this data is acquired.

The modulated region searcher 138 performs a process of labeling pixels in the frame (step S303). The modulated region searcher 138 detects a candidate region in the frame (step S304).

The modulated region searcher 138 determines whether at least one of the brightness and the color phase has changed between the candidate region and a region identical to the candidate region in the past frame (step S305).

If at least one of the brightness and the color phase has changed between the candidate region and a region identical to the candidate region in the past frame (YES in step S305), the modulated region searcher 138 further determines whether at least one of the changes in brightness and color phase continues in the predetermined number of past frames (step S306).

If at least one of the changes in brightness and color phase continues in the predetermined number of past frames (YES in step S306), the modulated region searcher 138 outputs information for specifying a change region in the frame to the controller 102. The controller 102 determines whether the ratio of the candidate region to the entire image (frame) is equal to or higher than a predetermined value (step S307). More specifically, the controller 102 specifies the ratio of the candidate region to the entire image (frame) based on information, from the modulated region searcher 138, for specifying a change region in the frame, and determines whether this ratio is equal to or higher than a predetermined value (for example, 30% or more).

If the ratio of the candidate region to the entire image (frame) is equal to or higher than the predetermined value (YES in step S307), the imaging mode changer 132 and the display mode changer 134 perform control to limit the digital zoom ratio of the imager 114 and the optical zoom ratio of the lens 112 upon the movement of the lens 112, and limit enlarged display in displaying a live view image on the display 107, so that this ratio of the candidate region becomes lower than the predetermined value (step S308). Note that only at least one of zoom limiting by the imaging mode changer 132 and enlarged display limiting by the display mode changer 134 may be done or both of these limiting operations may be done.

If only zoom limiting by the imaging mode changer 132 is to be performed, the imaging mode changer 132 calculates a zoom ratio at which the ratio of the candidate region to the entire image (frame) is, for example, 10% or less and sets the calculated zoom ratio as the upper limit of the zoom ratio. This allows the imager 114 to capture an image only at a zoom ratio equal to or lower than the upper limit of the zoom ratio. On the other hand, if only enlarged display limiting by the display mode changer 134 is to be performed, the display mode changer 134 calculates an enlarged display magnification at which the ratio of the candidate region to the entire image (frame) is, for example, 10% or less and sets the calculated enlarged display magnification as the upper limit of the enlarged display magnification on the display 107. This allows the display 107 to perform display only at an enlarged display magnification equal to or lower than the upper limit of the enlarged display magnification.

If both zoom ratio limiting by the imaging mode changer 132 and enlarged display limiting by the display mode changer 134 are to be performed, the imaging mode changer 132 and the display mode changer 134 cooperate with each other to calculate a zoom ratio and an enlarged display magnification, at each of which the ratio of the candidate region to the entire image (frame) is, for example, 10% or less, and set the calculated zoom ratio as the upper limit of the zoom ratio of the imager 114 and the calculated enlarged display magnification as the upper limit of the enlarged display magnification on the display 107.

Figure 11A:
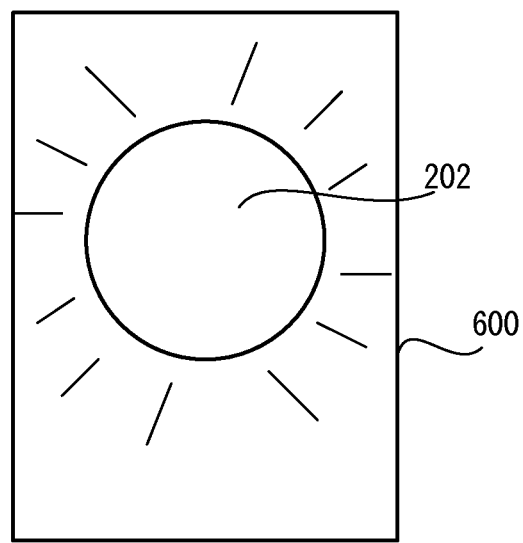
FIG. 11A is a view illustrating a fourth exemplary display screen of the smartphone, on which an entire image including an image in an optical communication region is displayed.
Figure 11B:
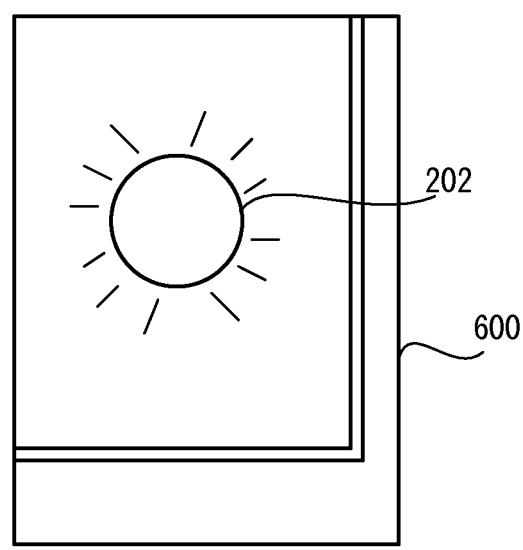
FIG. 11B is a view illustrating another fourth exemplary display screen of the smartphone, on which the entire image is displayed at a lower ratio of the image to the entire image.

With this operation, for example, an entire image 600 including an image 602 in an optical communication region 200 is normally displayed, as shown in FIG. 11A, while the entire image 600 is displayed at a lower ratio of the image 602 to the entire image 600, as shown in FIG. 11B, by zoom ratio limiting or enlarged display limiting.

After step S308 is completed, when any of determinations in steps S305, S306, and S307 is NO, the controller 102 then determines whether the processes in steps S305 to S308 have ended for all candidate regions (step S309). If a candidate region to be processed remains (NO in step S309), the operations in step S305 and subsequent steps are repeated. On the other hand, no candidate region to be processed remains (YES in step S309), a series of operations ends.

(Sixth Operation)

FIG. 12 is a flowchart showing a process of determining whether a change in mode is possible as the sixth operation during optical communication of the smartphone 100.

The display controller 136 in the controller 102 of the smartphone 100 acquires, through the image processor 116, frame image data captured by the imager 114 (step S351).

The controller 102 determines, based on an illuminance value obtained by the illuminance sensor 122, whether the illuminance in the vicinity of the smartphone 100 (environmental illuminance) is equal to or higher than a predetermined value (step S352).

If the environmental illuminance is lower than the predetermined value (NO in step S352), the controller 102 determines whether the user 500 is watching the display 107 (step S353). More specifically, the controller 102 acquires image data captured by the sub-imager 126 and performs an image analysis process such as face detection (detection of the positions of eyes) to determine whether the user 500 is watching the display 107.

If the user 500 is watching the display 107 (YES in step S353), the controller 102 determines, based on an acceleration value obtained by the acceleration sensor 121, whether the oscillation (acceleration) of the smartphone 100 is equal to or higher than a predetermined value (step S354).

If the oscillation (acceleration) of the smartphone 100 is lower than the predetermined value (NO in step S354), the controller 102 determines whether an explicit optical communication mode is set by the user 500 (step S355). The explicit optical communication mode set by the user 500 means herein a mode in which, for example, the optical communication region 200 in the image is designated by an operation such as tapping on the surface of the display 107 by the user 500.

If no explicit optical communication mode is set by the user 500 (NO in step S355), a process of lowering the contrast, shown in FIG. 3, is performed (step S356). On the other hand, if the determination in step S352 is YES, the determination in step S353 is NO, the determination in step S354 is YES, or the determination in step S355 is YES, a series of processes then ends.

As described above, when an image of the optical communication region 200 is captured, the imaging mode of the imager 114 or the display mode of the display 107 in the smartphone 100 is changed from a normal mode. More specifically, a process of lowering the contrast of the entire image (frame), a process of superimposing an icon image on the candidate region, a masking process for lowering the contrast of the candidate region, a process of reducing the count of display frames by image averaging or thinning, or a zoom limiting process of limiting the upper limit of the zoom ratio of the imager 114 or the upper limit of the enlarged display magnification on the display 107 is performed.

Lowering the contrast of the entire image (frame) reduces the difference in brightness within one image. This makes it easy to observe the image even when the optical communication region 200 blinks at a high frequency. Superimposing an icon image on the candidate region or lowering the contrast of the candidate region inhibits an image corresponding to the optical communication region 200 that has a high brightness from being displayed directly. This also makes it easy to observe the image even when the optical communication region 200 blinks at a high frequency. A process of reducing the count of display frames by image averaging or thinning makes it easy to observe the image even when the optical communication region 200 blinks at a high frequency, because an image corresponding to the optical communication region 200 in the displayed image is inhibited from blinking at a high frequency. A zoom limiting process of limiting the upper limit of the zoom ratio of the imager 114 or the upper limit of the enlarged display magnification on the display 107 makes it possible to reduce the ratio of an image corresponding to the optical communication region 200 to the entire image. This again makes it easy to observe the image even when the optical communication region 200 blinks at a high frequency.

Frame image data captured by the imager 114 is output to the buffer 118 to acquire contents by information decoding and also output to the image processor 116 for display on the display 107. Hence, both information decoding and image display can be appropriately performed without interfering with each other.

A process of lowering the contrast of the entire image is performed only when the user 500 is watching the display 107. Therefore, the contrast lowering process can be performed as needed to improve the visibility for the user 500.

The present disclosure is not limited by the description of the above-mentioned exemplary embodiments and the drawings, and the above-mentioned exemplary embodiments and the drawings can be applied with changes or the like as needed. In the above-mentioned exemplary embodiments, a process of lowering the contrast of the entire image is performed only when the user 500 is watching the display 107. However, a process of superimposing an icon image on the candidate region, a masking process for lowering the contrast of the candidate region, a process of reducing the count of display frames by image averaging or thinning, or a zoom limiting process of limiting the upper limit of the zoom ratio of the imager 114 or the upper limit of the enlarged display magnification on the display 107 may be performed only when the user 500 is watching the display 107.

In the above-mentioned exemplary embodiments, the smartphone 100 is used as a display device. However, the present disclosure is applicable to any display devices capable of capturing an image, such as a cellular phone, a tablet personal computer, or a laptop personal computer.

The functions of the smartphone 100 may be implemented by, for example, executing a program by the computer. A program for implementing the functions of the smartphone 100 may be stored on a non-transitory storage medium such as a CD-ROM (Compact Disc Read Only Memory) or downloaded to the computer via a network.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A display device comprising:
an imager configured to capture an image;
a display configured to display the image captured by the imager; and
a mode changer configured to change, when the image captured by the imager includes an image that bears a change of light from an information light source, at least one of an imaging mode implemented by the imager and a display mode of the image implemented by the display from a mode defined as a reference to a different mode for acquiring the image that bears the change of the light, the different mode being a mode in which display of the image that bears the change of the light on the display is made more suitable for observation than in the mode defined as the reference,
wherein the mode changer limits at least one of an enlarging process in capturing an image by the imager and an enlarging process in display on the display, so that a ratio of an image region of the image captured by the imager that corresponds to the image that bears the change of the light to an entirety of the image captured by the imager becomes not more than a predetermined value.

2. The display device according to claim 1, wherein the image that bears the change of the light includes an image of light from the information light source that changes in time series.

3. A display control method comprising:
capturing an image;
displaying the image captured in the capturing; and
changing, when the image captured in the capturing includes an image that bears a change of light from an information light source, at least one of an imaging mode implemented in the capturing and a display mode of the image implemented in the displaying from a mode defined as a reference to a different mode for acquiring the image that bears the change of the light, the different mode being a mode in which display of the image that bears the change of the light on the display is made more suitable for observation than in the mode defined as the reference,
wherein the changing comprises limiting at least one of an enlarging process in the capturing and an enlarging process in the displaying, so that a ratio of an image region of the image captured in the capturing that corresponds to the image that bears the change of the light to an entirety of the image captured in the capturing becomes not more than a predetermined value.

4. A non-transitory recording medium having a program executable by a computer recorded thereon, the program controlling the computer to function as:
a display outputter for outputting, to a display, an image captured by an imager; and
a mode changer for changing, when the image captured by the imager includes an image that bears a change of light from an information light source, at least one of an imaging mode implemented by the imager and a display mode of the image output from the display outputter from a mode defined as a reference to a different mode for acquiring the image that bears the change of the light, the different mode being a mode in which display of the image that bears the change of the light on the display is made more suitable for observation than in the mode defined as the reference,
wherein the mode changer limits at least one of an enlarging process in capturing an image by the imager and an enlarging process in display on the display, so that a ratio of an image region of the image captured by the imager that corresponds to the image that bears the change of the light to an entirety of the image captured by the imager becomes not more than a predetermined value.

* * * * *